June 26, 1956
R. H. LARSON
2,751,815
STRIP FILM PROJECTION APPARATUS
Filed June 3, 1952
2 Sheets-Sheet 1
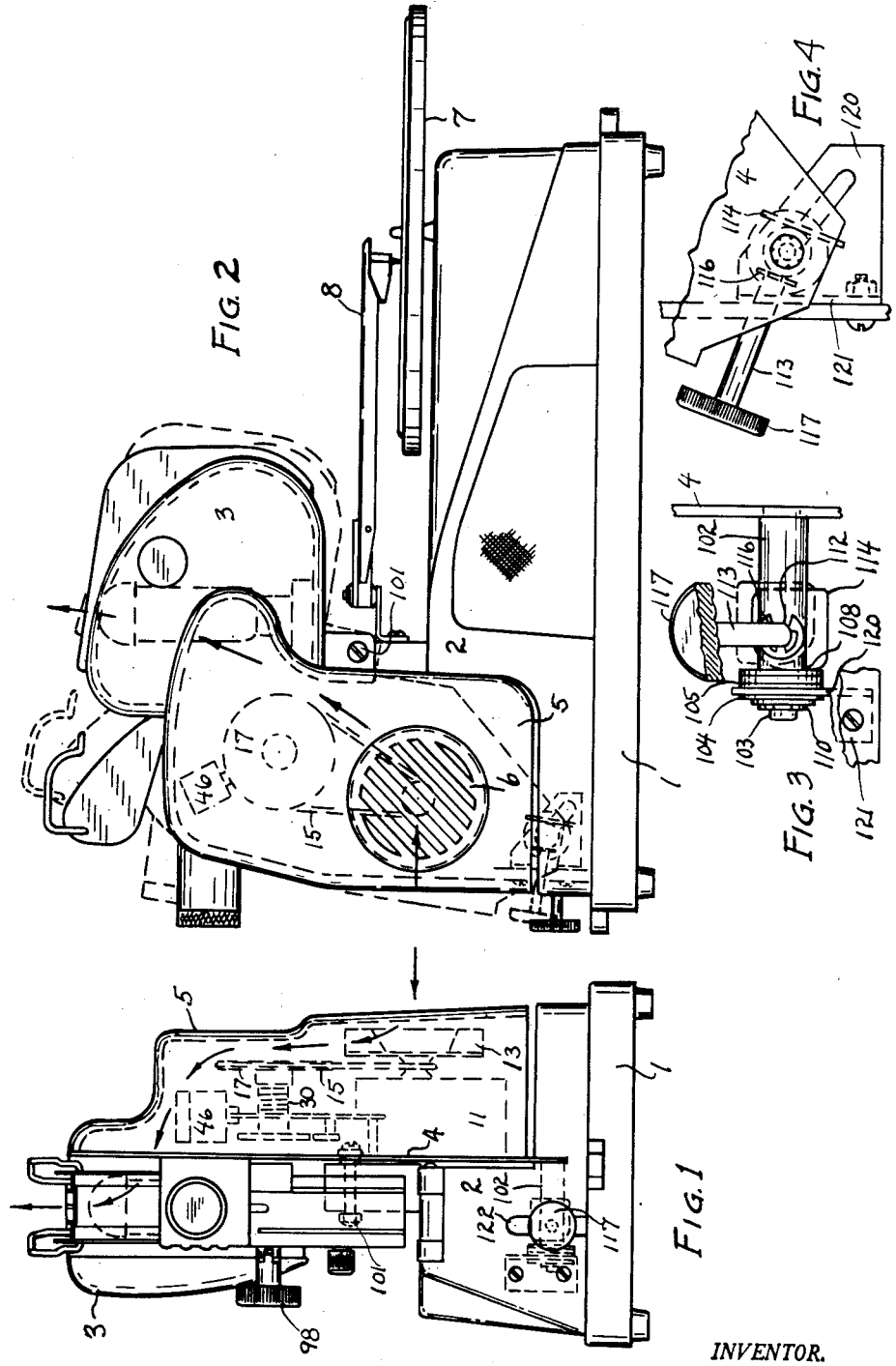
INVENTOR.
ROBERT H. LARSON
BY
Robert L. Kahn
atty June 26, 1956
R. H. LARSON
2,751,815
STRIP FILM PROJECTION APPARATUS
Filed June 3, 1952
2 Sheets-Sheet 2
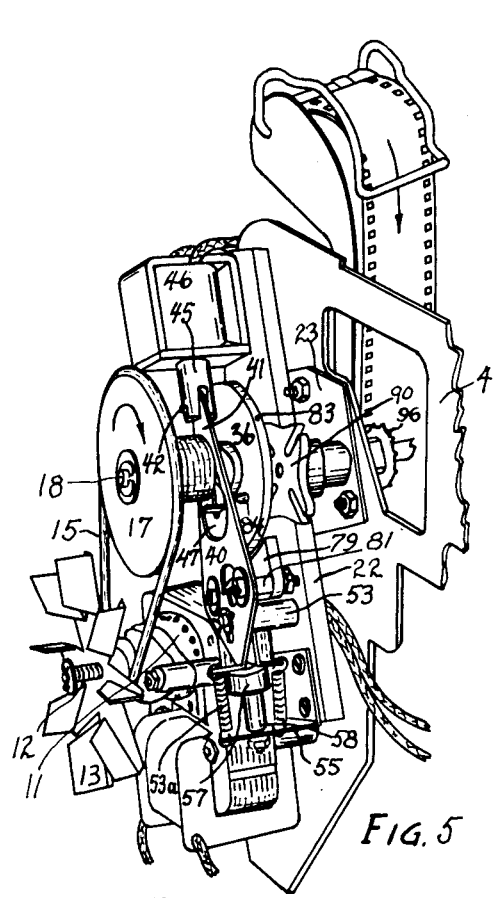
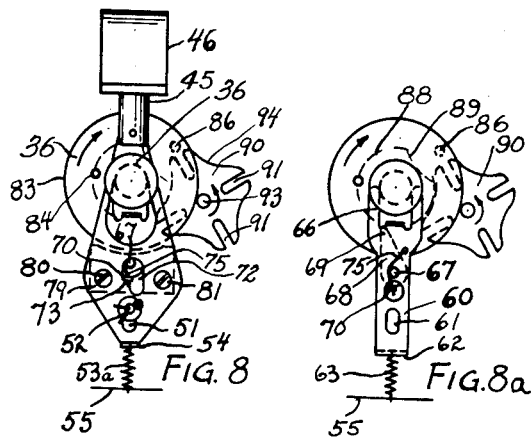
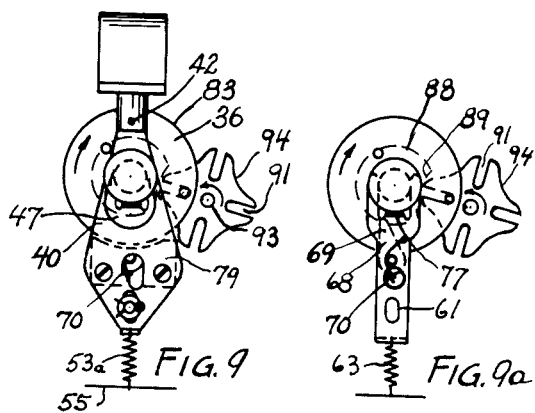
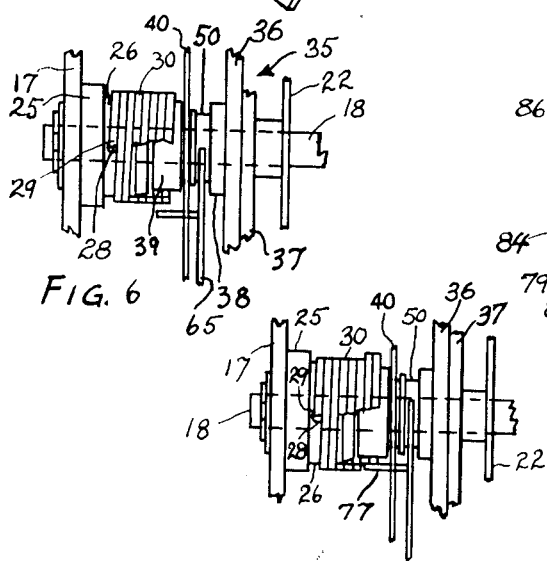
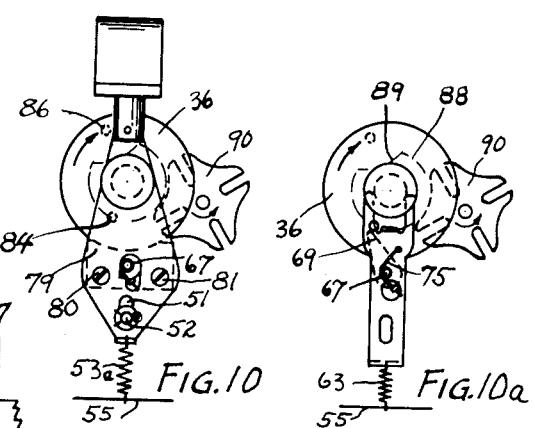
INVENTOR.
ROBERT H. LARSON
BY
Robert L Kahn
atty

# United States Patent Office 2,751,815
Patented June 26, 1956

2,751,815

STRIP FILM PROJECTION APPARATUS

Robert H. Larson, Batavia, Ill., assignor to Du Kane Corporation, St. Charles, Ill., a corporation of Illinois Application June 3, 1952, Serial No. 291,371

10 Claims. (Cl. 88—28)

This invention relates to a projection apparatus, and particulary to the type of projection apparatus used in connection with strip film. Such apparatus differs from a moving picture projector in that a film frame may be retained at the film gate for an indefinite length of time and, in all cases, will be retained long enough so that the audience may understand the image projected. Projectors of this type have customarily been provided with a manual frame advance. As a result, such projectors are not adapted for remote control.

In an attempt to provide a remote control means for strip film projectors, various power drives have been provided. Such power drives have been generally unsatisfactory for a number of reasons. Thus the drive mechanism has either been too bulky and expensive to provide the necessary power for driving or has not been heavy enough to perform the required work. Furthermore it is necessary that one frame be advanced in response to each actuating signal, irrespective of the duration of such actuating signal.

The mechanism forming the subject matter of the present invention has been particularly designed so that the mechanism may be light and yet have sufficient power to drive a strip film one frame past the film gate. In general, I prefer to have a continuously operating motor and wheel wherein a certain amount of kinetic energy is stored. At desired times and in response to desired signals, an intermittent mechanism is driven through one operating cycle for a signal for advancing the strip film one frame only. The mechanism forming the subject matter of the present invention is particularly adapted to drive a standard film sprocket mechanism and thus may be readily adapted to conventional strip film projectors.

The present invention further provides a continuously operating blower or fan which is driven by the motor, said fan providing a cooling blast of air for the projector and particularly for the projector lamp. It is well known that strip film projectors have comparatively low power lamps to provide light for projection purposes. Up to now, the limiting factor in determining the wattage input for the lamp has been the ability of the lamp to remain cool. A continuously operating motor present in my new film drive construction has a fan and housing so designed that a blast of air created by the fan is directed against and cools the projector lamp.

A characteristic feature of my improved strip film projector therefore includes a continuously operating fan for generating a blast of air and a housing for directing the blast of air through the lamp housing thereby permitting the use of larger and more powerful lamps.

For a more thorough understanding of the invention, reference will now be made to the drawing wherein, an exemplary embodiment of a structure embodying the present invention is shown, it being understood, however, that variations may be made without departure from the spirit of the invention.

Referring therefore to the drawings:

Figure 1 is a front elevation of a projector embodying the present invention, the arrows showing the direction of air travel through the housing when the projector is operating;

Figure 2 is a side elevation of the projector shown in Figure 1, the projector being combined with an electric phonograph reproducer and the projector proper being shown in an alternative position illustrating the operation of the projector adjustment;

Figure 3 is a detail from the front of the elevation adjusting means;

Figure 4 is a detail from the side of the elevation adjusting means;

Figure 5 is a perspective view of the mechanism for driving the strip film;

Figures 6 and 7 are details of the clutch in inoperative and operative positions;

Figures 8 to 10 inclusive, are details from one side showing the Geneva movement and related means in various positions during an operating cycle;

Figures 8a to 10a inclusive are figures corresponding to Figures 8 to 10 inclusive, but showing the rear side of the mechanism in the various positions.

Referring first to Figures 1 and 2, the combined projector and phonograph is carried upon base 1 of metal or other suitable material and having legs as shown for resting upon any suitable support. Base 1 carries supporting structure 2 upon which is mounted vertical panel 4 carrying the various parts of the projector proper. Vented lamp housing 3 is suitably supported upon panel 4. The film drive mechanism, to be described later, is covered by shroud 5 suitably shaped, the shroud having the upper portion thereof cooperating with lamp housing 3 so that an air blast may enter the lamp housing from within the shroud. Shroud 5 has grille or louvre 6 for admitting cold air into the shroud. The air may travel within the shroud, pass through a cut-out in panel 4 and enter the lamp housing. The air can pass through the lamp housing by means of vents.

Structure 2, resting upon base 1, extends the full length of the base and is suitably shaped to provide an amplifier compartment and a speaker, neither one of which are shown. A turntable motor is also suitably disposed within structure 2 and drives turntable 7. Tone arm 8 cooperates with a record upon the turntable for reproducing sound or music as desired. Inasmuch as the details of the electric phonograph and the disposition of the various parts of the phonograph and amplifier associated with the phonograph form no part of the present invention, no description thereof will be given.

Referring now to Figures 5 to 8 inclusive, the mechanism for film advance is mounted upon metal panel 4. Near the bottom of panel 4 is mounted motor 11 having shaft 12. Motor 11 is of any suitable type and may conveniently be of the shaded pole induction type. Shaft 12 carries blower rotor 13 and also carries a pulley, not shown, driving belt 15. Belt 15 transmits power to pulley wheel 17 mounted for rotation upon spindle 18. Spindle 18 is rotatively supported upon elongated support member 22 which constitutes a subbase and is itself rigidly secured by lateral extensions 23 to panel 4.

Pulley wheel 17 has hub 25 rigidly attached thereto, this hub having reduced machined hub portion 26 extending toward panel 4. Machined hub portion 26 has recess 28 near the shoulder formed by hub 25, this recess being disposed inwardly and adapted to anchor hooked end 29 of coil spring 30 disposed around hub 26. Coil spring 30 is shown as of flat wire with the turns disposed adjacent each other to form a single layer. However, round spring wire may be used. Coil spring 30 extends along finished hub portion 26 and beyond the end for a sufficient distance so that a substantial number of spring turns are free of hub 26.

Only hooked end 29 of the coil spring is anchored to hub portion 26, the remaining end of the coil spring being free.

It is understood that the pulley wheel and hub portion, together with the spring, are freely rotatable around spindle 18 and are driven by motor 11. Rotatably disposed around spindle 18 and positioned between subbase plate 22 and hub 26 is an intermittently rotatable assembly generally indicated by numeral 35. Assembly 35 includes disc 36 having a Geneva type cam 37 on one side and a slotted collar 38 upon the other side. Slotted collar 38 has clutch driven or follower portion 39 consisting of a short length of cylinder substantially equal to the diameter of finished hub portion 26. Clutch follower portion 39 is disposed in face to face relation to hub portion 26 and is covered by the part of coil spring 30 which extends beyond hub portion 26.

The diameter of clutch follower portion 39 is sufficiently smaller than the inside diameter of coil spring 30 so that normally the loose turns of the coil spring will not grip clutch follower portion 39 even though the coil spring is being revolved with the pulley wheel hub. The direction of twist of coil spring 30, as seen from the hooked end, is opposite to the direction of rotation of the pulley wheel. If the free turns of the coil spring are pressed against clutch follower portion 39, the rapid rotation of the pulley wheel in the direction indicated in Figure 5 will tighten the coil spring around follower portion 39 and cause the overhanging part of the coil spring to grip clutch follower portion 39. The retention of the coil spring upon clutch follower portion 39 will persist as long as there is some drag upon the end turns of the coil spring. As soon as this drag disappears, the tendency for the coil spring to relax its grip will function to disconnect hub clutch driver portion 26 from clutch follower portion 39.

The means for accomplishing the engagement and disengagement of the coil spring from clutch follower part 39 will now be described.

Actuating plate 40 has top end 41 secured, as by a pin 42, to the forked end of solenoid plunger 45. Plunger 45 cooperates with solenoid winding 46 and is adapted to be pulled generally upwardly upon energization of the solenoid winding.

Actuating plate 40 has elongated tapered slot 47 extending lengthwise of the plate. The bottom of slot 47 is wide enough so that the actuating plate may be slipped over reduced portion 50 on follower portion 39. In the normal operating positions of the actuating plate, the narrower part of the tapering slot 47 is used and this part of the slot is sufficiently narrow so that the actuating plate will be locked laterally to reduced portion 50 of the slotted collar.

The bottom portion of the actuating plate is provided with slot 51 lengthwise of the plate. Guide pin 52 is threaded into a suitable post 53 carried by subbase member 22. Guide pin 52 has an enlarged head thereon or may have suitable washers so that the guide pin and post together maintain that portion of the actuating plate against lateral movement but permit some longitudinal movement within the limits of slot 51. Actuating plate 40 is biased downwardly, as seen in Figure 5, by spring 53a extending between tailpiece 54 of the actuating plate and angle piece 55 carried by auxiliary plate member 22. Flexible stop 57 of rubber or other suitable shock absorbing material is carried by bolt 58 supported by angle iron 55 and this serves to provide a stop for the lower limit of travel of the actuating plate.

Pin 52 supports clutch control plate 60. Plate 60 is disposed against the inside surface of actuating plate 40, the inside surface being the surface toward panel 4. Plate 60 is provided with slot 61 permitting clutch control plate 60 to move longitudinally. Plate 60 has tail piece 62 engaged by spring 63 carried by angle iron 55. Thus clutch-actuating plate 60 is biased to a position remote from the spindle axis, here shown as a generally downward position. Plate 60 has upper end portion 65 shaped to provide two fingers or tines 66 large enough to slide over reduced portion 50.

Clutch control plate 60 carries pivot pin 67 supporting detent member 68 having fingers 69 and 70 at the two ends thereof. Detent member 68 is on the rear side of plate 40 as seen in Figure 8. Finger 70 is bent at right angles to the plane of the detent member, passing through an aperture in plate 60 and operates in slot 72 of plate 40. This slot has shoulder portion 73. Spring 75 around pin 67 biases the detent member so that end 70 rests against shoulder portion 73.

The detent member, when in active position as shown in Figures 8 and 9, serves to couple the actuating plate and clutch control plate to move together toward the spindle axis. However, upon turning movement of detent member 68, clutch-actuating plate 60 is released to drop in response to its spring bias, even though the clutch control plate itself is still in its upper position. The clutch control plate need only move longitudinally and the forked end serves to guide the clutch control plate in its movement.

Clutch control plate 60 has a clutch-actuating presser finger 77 integral therewith and bent to extend across the coils of spring 30. The disposition of presser finger 77 is such that in the downward position of the actuating plate and clutch control member, finger 77 is clear of the turns of the coil spring. However, when actuating plate 40 is moved toward the spindle axis in response to solenoid energization and carries clutch control member 60 with it, presser finger 77 presses upon the turns of the coil spring overlying clutch follower portion 39. The action of this presser finger serves to impart a braking movement or force upon the spring turns and causes the same to tighten and engage clutch follower member 39.

The arrangement of the clutch presser finger and clutch control plate 60 is such that clutch presser finger 77 will engage the turns of the coil spring before actuating plate 40 has reached the limit of its travel toward the spindle axis. When detent 68 is released, to permit clutch control plate 60 to move away from the spindle, actuating plate 40 will be free to move further toward the spindle.

Carried by actuating plate 40 is brake shoe 79, this shoe being carried by bolts 80 and 81. Brake shoe 79 may be of any suitable material having substantial friction against iron or steel and may, for example, be of leather, felt or the like. Brake shoe 79 cooperates with brake drum periphery 83 of driven disc 36. It is understood that the brake shoe is stopped short of engaging the braking surface so long as presser finger 77 rests against the turns of the coil spring. When detent 68 is released (Fig. 10), clutch control member 60 drops and the brake shoe is moved into engagement with the brake disc.

Brake disc 36 carries pin 84 extending away from the outer face thereof (toward pulley wheel 17). Pin 84 is so disposed as to engage detent finger 69, upon rotation of disc 36. When pin 84 engages finger 69, it swings the detent into disengaging position for releasing clutch control plate 60 for declutching. Pin 84 is oriented angularly to accomplish the declutching action at a proper time in the cycle of operation of the entire mechanism.

Disc 36 carries pin 86 upon the inner face thereof (away from pulley wheel 17) and also carries Geneva cam 37. This cam has a generally circular portion 88 and an arcuate inwardly recessed portion 89. Cooperating with Geneva cam 37 is Geneva star wheel 90 having, in this particular instance, four slots 91 disposed at 90 degree intervals around the axis of the driven part. Geneva wheel 90 is mounted for rotation on shaft 93, this representing the load. Wheel 90 has portions 94 shaped to conform to the circular shape of the cam to prevent rotation of the gear except when pin 86 engages a slot or tooth 91.

Shaft 93 forms part of a film sprocket drive having any desired construction and including sprockets 96 and knob 98. The sprocket drive includes suitable clutch means between knob 98 and the shaft so that the sprockets may be turned independently of the shaft for film framing. Such clutch means are well known and need not be described.

The operation of the entire mechanism is as follows: Motor 11 runs continuously and drives pulley wheel 17 in the proper direction, as shown. Assuming that the solenoid is not energized, the motor will simply turn the pulley wheel idly. The blower will force a blast of air through the vented lamp housing to cool the lamp. When the solenoid is energized through suitable manually controlled means, the actuating plate is pulled upwardly toward the dead spindle and carries with it clutch control member 60 and presser finger 77. The pressure of finger 77 upon the end turns of the coil spring results in a clutching action and causes follower part 39 to turn with hub 25 of the fly wheel. Pin 86 engages the Geneva wheel 90 and turns the same 90 degrees, thus advancing the sprocket one frame. Pin 84 thereafter engages detent 68 and releases the clutch while permitting the brake shoe to be applied to the brake disc. Thus the brake disc is stopped quickly. Only one operating cycle occurs for a solenoid energization, irrespective of the duration of solenoid energization.

The projector elevator control shown in detail in Figures 3 and 4 will now be described. Panel 4 is pivotally supported at 101 to a stationary extension of structure 2. Thus panel 4 and all the mechanism and lamp housing may be moved around 101 as a pivot axis. Rigidly secured in the lower part of panel 4 is post 102, extending laterally therefrom. For convenience, the post extends from the lamp housing side of panel 4. Free end portion 103 of post 102 is reduced in diameter and accommodates loose washers 104 and 105. Washer 105 is a compression type washer and may consist of two metal washers with leather or felt cemented between them. Post 102 has shoulder 108 against which compression washer 105 may bear. The free end of reduced portion 103 is slotted to accommodate C washer 110. Thus the C washer and shoulder 108 will both limit lateral travel of the loose washers.

Post 102 has transverse aperture 112 through which pin 113 passes. Pin 113 carries cam plate 114 at one free end, the cam plate being parallel to but offset from the axis of post 102. The shape of cam plate 114 is such that in the dotted line position in Figure 3, the side of the plate clears the outside of washer 105. When turned to the full line position, the cam plate will be translated in its own plane to bear against washer 105. Pin 113 is slotted near post 102 on the side remote from cam plate 114 to accommodate C washer 116. The cam plate and C washer will lock pin 113 in post 102, although the pin is free to turn. Knob 117 on the free end of pin 113 permits an operator to turn the pin and cam plate.

Disposed between loose washers 104 and 105 and threaded over reduced portion 103 of post 102, is slotted bracket 120 having part 121 bolted to structure 2. The entire elevating mechanism described is disposed within structure 2, except that knob 117 projects outside of the structure. Slot 122 in the wall of structure 2 permits vertical play of pin 113 as the vertical panel is adjusted.

It is obvious that in the dotted line position of the cam plate, the loose washers on both sides of slotted bracket 120 will permit vertical adjustment of the projector. In the full line position, the washers clamp the bracket and lock the projector in position.

What is claimed is:

1. A manually controlled film frame advance mechanism for a strip film projector, said advance mechanism comprising a base including a vertical supporting panel, one side of said panel having a film sprocket including a sprocket shaft, the other side of said panel having mechanism as follows: a Geneva star wheel on said sprocket shaft, a spindle offset from but parallel to said sprocket shaft, a first sleeve and Geneva cam on said spindle, said sleeve constituting a clutch follower part, a second sleeve freely rotatable on said spindle, a coil spring on said second sleeve having one end thereof rigidly joined to said second sleeve and having the other end thereof free with free end spring turns overlying said first sleeve, the free spring coils being normally loose on said first sleeve, an electric motor supported on said panel, means for driving said second sleeve and coil spring from said motor, a presser finger for engaging the loose turns of the coil spring to force the same against the first sleeve, means for biasing said presser finger to an inoperative position from which position it may be moved to an operative position for engaging the spring coils to cause clutch action, manually controlled means for moving said presser finger into an operative position for causing clutch engagement, and means operated by the turning of said first sleeve for disengaging said presser finger to permit the same to respond to its bias, said presser finger being tripped when said first sleeve makes a complete turn.

2. The construction according to claim 1, wherein said manually controlled means for moving said presser finger includes a brake member, a disc carrying said Geneva cam being provided upon which said brake member can operate, detent means normally coupling said brake member and presser finger, said presser finger stopping the brake member short of its operating position on the disc when said finger bears upon the spring coils, said manually controlled means acting upon said brake member, said presser finger tripping means acting upon said detent means to free the presser finger from the brake member, said manually controlled means acting upon the brake member for forcing said brake into engagement with said disc.

3. A manually controlled film frame advance mechanism for a strip film projector, said mechanism comprising a base including a vertical supporting panel, one side of said panel having a film sprocket including a sprocket shaft, the other side of said panel having mechanism as follows: a Geneva star wheel on said sprocket shaft, a dead spindle offset from but parallel to said sprocket shaft, a disc and Geneva cam on said spindle, said disc having a sleeve, said sleeve, disc and cam being rigidly coupled to rotate as a unit, a second sleeve on said spindle aligned with said first sleeve, a helically coiled spring on said second sleeve and having one end rigidly anchored thereto and the other end free with the end turns loosely overlying at least part of said first sleeve, said loose turns when tightened upon said first sleeve and upon rotation of second sleeve in a proper direction, providing clutch action, an electric motor supported on said panel below said dead spindle, a belt drive between the motor and second sleeve, a pair of members movable in a direction perpendicular to the dead spindle, means for biasing said two members away from said spindle from which position said two members may be moved toward said spindle, one of said members having a presser finger adapted to engage the loose spring turns for pressing the same against said first sleeve to cause clutch engagement, spring detent means coupling said two members together, manually controlled means for moving said second member against its bias toward the spindle, said second member carrying said first member with it to cause clutch engagement, and means carried by said disc for tripping the detent means connecting said two members upon one turn of said disc whereby said clutch is engaged for one turn only.

4. The construction according to claim 3, wherein said manually controlled means includes a solenoid having an armature, and means for connecting said armature to said second member.

5. The structure according to claim 3, wherein a brake is provided for cooperation with the periphery of said disc, means for mounting said brake on said second member, said second member having a range of travel against its spring bias which is great enough to permit contact of the brake shoe upon said disc, said first member stopping said second member during the movement of said second member for clutch action at a point short of brake engagement, said second member being adapted to move further toward said disc for brake engagement when said first member is tripped and returns to its normal biased position.

6. A manually controlled film frame advance mechanism for a strip film projector, said mechanism comprising a base including a vertical supporting panel, one side of said panel having a film sprocket including a sprocket shaft, the other side of said panel having mechanism as follows: a Geneva star wheel on said sprocket shaft, a dead spindle offset from but parallel to said sprocket shaft, a combined sleeve, disc and Geneva cam on said spindle, said sleeve having a reduced portion and said sleeve constituting the follower part of a normally disengaged clutch, a second sleeve on said spindle aligned with said first sleeve, a helically-coiled spring on said second sleeve and having one end thereof rigidly anchored thereto and the other end of said spring free with the end turns loosely overlying at least part of said first sleeve, said second sleeve and coil spring constituting the clutch driver part, said loose turns of said coil spring when tightened upon said first sleeve during rotation of the second sleeve in proper direction providing clutch action, an electric motor supported on said panel below said dead spindle, a belt drive between the motor and second sleeve, a member having an elongated slot disposed on the reduced portion of said first sleeve, said slotted member being movable along a line perpendicular to the spindle axis, means for biasing said slotted member to a position away from said spindle, manually controlled means for moving said slotted member toward said spindle, a second member carrying a presser finger means for mounting said second member on said slotted member so that said second member is movable relatively thereto to and from the spindle axis, means for biasing said second member to an end position away from the spindle where the presser finger is free of the coils of the spring, spring means for coupling said second member to said slotted member when said slotted member moves toward said spindle, said presser finger engaging the loose coil turns upon the first sleeve when it is moved toward the spindle axis by said slotted member, a pin on said disc, said pin being oriented and located to engage said spring means for uncoupling the second member from said slotted member to permit said second member to return to its normal biased position after said Geneva movement has made one operating cycle, said slotted member being free to move in response to said manually controlled means further toward the spindle axis upon release of said second member therefrom and brake means operated by said slotted member upon said subsequent further movement, said brake means cooperating with said disc to maintain the Geneva movement tight in spite of the continued application of force to said slotted member to maintain the same in its inner position nearest to the spindle axis.

7. The structure according to claim 6, wherein a solenoid is provided, an armature for said solenoid and means connecting said armature and said slotted member for causing clutch action.

8. The structure according to claim 6, wherein said second member carrying the pressure finger is forked, having two tines disposed over the reduced portion of said first sleeve to guide said second member.

9. In a strip film projection apparatus adapted for projection of individual film frames in response to separate signals, the combination of a base, a vertical supporting plate lying in a plane generally parallel to the line of projection, a vented housing for a projector lamp and sprocket film advance means supported on one side of said plate, said lamp housing being near the top of said plate, an electric motor, a power operated film advance means operatively connected to said sprocket film advance means, means for supporting said motor and power operated film advance means on the other side of said vertical plate with the motor near the bottom of the plate, a power drive from said motor to said power operated film advance means, said power drive including a blower and a normally disengaged clutch, said clutch having driver and follower parts, the motor, blower and clutch driver part being connected together for simultaneous operation, a manually controlled member for providing clutch engagement, said clutch being of the type which engages for one operating cycle only to advance the film by one frame in response to one manual clutch control operation and automatically disengages and remains disengaged until a separate subsequent manual clutch control operation occurs, means for driving said motor continuously during projector use and thereby drive said blower and clutch driver part continuously, said vertical plate having a cut-out at the lamp housing, a second housing for said motor, blower, power drive means and power operated film advance means, all of said parts being within the second housing and being on the other side of said plate, said second housing extending high enough so that the plate cut-out connects the regions within the two housings, said second housing having an air inlet whereby fresh air is sucked into the second housing and thence passes through the plate cut-out and into the lamp housing and thence outside, said air serving to cool the motor and mechanism within the second housing and thence to cool the lamp in the first housing.

10. The apparatus according to claim 9 wherein the blower is on the shaft of the motor and wherein a belt drive is provided between the motor shaft and the clutch driver part.

References Cited in the file of this patent

UNITED STATES PATENTS

| Number | Name | Date |
|---|---|---|
| 1,153,110 | Jenkins | Sept. 7, 1915 |
| 1,201,727 | Headley | Oct. 17, 1916 |
| 1,624,669 | Lehwess | Apr. 12, 1927 |
| 1,771,509 | Ott | July 29, 1930 |
| 1,869,888 | Dina | Aug. 2, 1932 |
| 1,971,454 | Loomis | Aug. 28, 1934 |
| 2,222,837 | Goldberg | Nov. 26, 1940 |
| 2,292,309 | Wellman et al. | Aug. 4, 1942 |
| 2,296,344 | Guercio | Sept. 22, 1942 |
| 2,371,504 | Cheney et al. | Mar. 13, 1945 |
| 2,395,883 | Krows | Mar. 5, 1946 |
| 2,516,979 | Gould et al. | Aug. 1, 1950 |
| 2,550,272 | Karr | Apr. 24, 1951 |
| 2,575,203 | Wolfner | Nov. 13, 1951 |